W. L. Gregory,
Skate,
No. 1,454, Reissued Apr. 14, 1863.
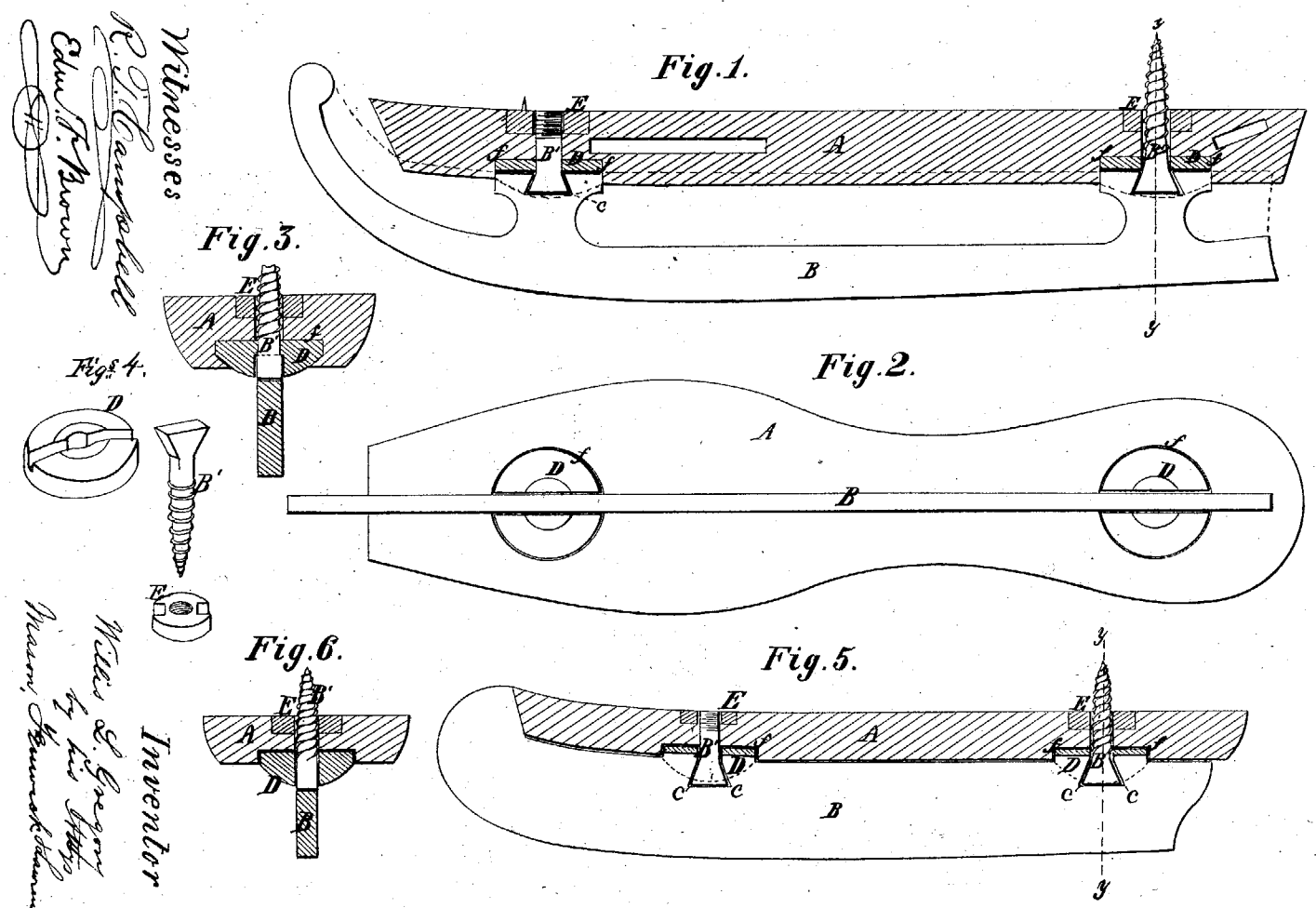
Witnesses
R. T. Campbell
Edw. F. Brown
Inventor
Willis L. Gregory
by his Attys
Mason, Fenwick & Lawrence
A.M. PHOTO-LITHO. CO. N.Y. (OSBORNE'S PROCESS)

UNITED STATES PATENT OFFICE.

WILLIS L. GREGORY, OF AMSTERDAM, NEW YORK, ASSIGNOR TO HIMSELF AND G. LONDON, JR.

IMPROVEMENT IN SKATES.

Specification forming part of Letters Patent No. 34,611, dated May 4, 1862; Reissue No. 1,454, dated April 14, 1863.

*To all whom it may concern:*

Be it known that I, WILLIS L. GREGORY, of Amsterdam, in the county of Montgomery and State of New York, have invented a new and useful Improvement in the Construction of Skates; and I do hereby declare that the following is a full, clear, and exact description of the same, reference being had to the accompanying drawings, making a part of this specification, in which—

Figure 1 is a longitudinal vertical section of my invention taken in the line *x x*, Fig. 2. The red line shows the open runner as substituted by a closed runner. Fig. 3 is a transverse section of my invention in the line *y y* of Fig. 1. Fig. 4 shows perspective views of the longitudinally-grooved socket or washer, the screw-fastening, and the turn-button nuts. Fig. 5 is a view similar to Fig. 1, but showing the runner made broader between the shoulders of the runner. Fig 6 is a transverse section in the line *y′ y′* of Fig. 5.

Similar letters of reference in the several figures indicate corresponding parts.

In the use of ice-skates it has been found that lightness and strength are very desirable; also that convenience for tightening up the skate-iron with respect to its stock should be afforded, in order to obviate the inclining of the runner and prevent a thrust of the runner, when inclined, from splitting the stock. Likewise to have the runner fitted snug and fast to the under side of the stock, but not so that any swell in the wood, owing to becoming saturated with water, shall cause the splitting of the stock when the weight of the skater comes upon the sides of the stock. To answer by a very simple contrivance all these requirements is the object of my invention; and the nature of the same consists, first, in a metallic, longitudinally-grooved, and vertically-perforated washer or socketed plate so constructed that when applied to a skate it serves as a support, also as a means of confining the runner against lateral and longitudinal play, and at the same time relieves the screw-fastening of much of the strain which usually comes upon it, and also lessens the liability of the runner getting loose, and answers, whenever it does get loose, as a means for again bringing it snugly in position and finally, so braces the skate across its width, by bearing against the stock and the runner, that the liability of the stock splitting when the weight of the skater is thrown upon its sides is almost wholly, if not quite, prevented.

My invention consists, second, in the combination of a detached screw and a longitudinally-slotted and vertically-perforated washer, as a means for uniting skate-irons to wood stocks of skates.

It consists, third, in a detached "wood" screw whose head has two bevel sides and two parallel sides, when such screw-head forms a flush continuation of the skate iron below the washer or socketed plate, as herein shown.

It consists, fourth, in a skate and fastening devices so constructed that the functions herein named are performed, and still the screw and the washer are disconnected in their manufacture from one another, and each disconnected in like manner from the runner and stock, but all brought together, when the skate is finished, by the action of a screw-nut, as hereinafter described.

It consists, fifth, in the interposition of a longitudinally-grooved and vertically-perforated washer between the wooden stock, the skate-iron, and the head of a detached screw which passes up through said washer while the iron enters the groove of the washer, all as hereinafter described.

To enable others skilled in the art to make and use my invention, I will proceed to describe its construction and operation.

A represents the stock of the skate, and B the runner or "skate-iron." The stock and runner may be constructed in any of the known and approved styles and of the materials best adapted to the purpose.

The upper edge of the runner may have narrow standards extending from it at two points, or the blade or runner may be constructed as represented by red lines in Fig. 1. The knees may be of the usual construction, and each notched out in the form of a dovetail, as shown at *c*. If a solid or wide blade runner is adopted the recesses *c c* will be formed in the upper edges thereof at points corresponding to those of the knees or standards.

The stock when runners with standards are used is not grooved along its whole length, but may have two shallow sockets or recesses, *f f*, at points corresponding with the location of the standards of the runner cut in its under surface. These recesses may be of circular form, and should be struck from the center of the width of the stock. If the blades have no standards, as is often the case in the manufacture of the various desired styles of skates, the groove in the stock will strike out from the circular recesses. I will here state that circular recesses in the under side of skate-stocks, and also that skate-irons without and with standards, are not inventions at this stage of the art. Further, that grooved and ungrooved stocks are common things in the trade, and were known long before my use thereof.

To combine the runner with the stock by devices which are separate from one another in their manufacture and also separate from the stock and the runner previously to the connecting of the parts together, I adopt two screws, B′ B′, commonly known by the term "wood-screws," while they are composed of metal. The heads of these screws I plane off on two sides, so that they are just as thick as the skate-runner, and when applied to this runner will form a flush continuation of the runner, as shown in Fig. 3. The heads of the screws B′ B′ are set into the dovetail recesses *c c*, and the shanks of the screws extend up through these recesses, while the bevel portions of the head are overhung by the under beveling portions of the metal about the recesses. The heel-screw is pointed, and extends up from the runner far enough to constitute a holdfast for the heel of the skater's boot. The toe-screw is just long enough to extend flush with the top of the wood stock when the skate is finished.

I also adopt washers or socketed plates D D as the intermediate support, above the top of the runner and on the under side of the stock. These washers are grooved longitudinally in their under side to a considerable depth, and the groove is intersected vertically by means of a screw-hole (corresponding in size with the screw) cut down through the washer. The washers thus constructed are made flat on top and may be conical or spherical on their bottom or under surface. The flat side gives a snug fit to it against the skate-stock, while the conical form will give great lightness and length and depth of bearing to the sides of the knees or recessed portions of the runner.

The washers, it will be seen, are in their action similar to a diagonal brace or truss, and if they were made of bars in skeleton form a truss of that character would be produced.

The washers constitute metallic sockets, and take the place of recesses cut in the under side of the stock and usually filled by unslotted washers or collars manufactured on the skate-iron or made separate therefrom.

Now, to put the stock and runner firmly together I, insert the heads of the screws into the recesses *c c*, but do not use any rivet device to confine them immovably in place. The washers are then inserted in the sockets or recesses *f f* of the stock, and the screws passed up through the washers and through the wood stock and the whole firmly brought together and fastened by means of turn-button nuts E E, applied to the upper ends of the screws and screwed down to the top of the skate. In many skates the turn-buttons are made to come flush with the top of the stock by providing recesses for their reception, as represented, and as this is a good plan, but common, I have adopted it.

The gist of my invention lies in the substitution of a grooved metal washer-plate which is adapted to use with all kinds of runners and stocks at a point below the top of the skate and above the head of a detachable screw-fastening, and when thus used takes the place of all other devices heretofore used, and in that place acts as a stay or lateral brace both on the right and on the left, and obviates the difficulty resulting from too great tightness of the runner in its groove or socket, or too great looseness thereof, due to the changes in wood under the effects of water and heat, which changes are but slightly experienced in metal and when experienced can be readily obviated or compensated for by reason of the broad surface-bearing afforded by the washers and the ready manner in which the action of the screws is brought to bear upon them, (the washers.)

It is a very common thing in using wooden-stock skates for the stocks to slit longitudinally or in a direction with the grain of the wood. The reason of this is that in such skates the runners are each fitted in a groove which is cut in the wood, and all the bearing is directly upon the edge of the runner. When water gets into this groove and swells the wood, there is a bind between the wood and the metal, the weaker material yields, and the stock splits.

Again, if the skate has been laid by for some time after it has been thoroughly saturated with water the action of the heat upon it is to contract the wood and leave the runner loose in its groove. Then when the skate is brought into use, the lateral bearing having been destroyed, the runner inclines over laterally, and, acting like a lever or pry upon the stock, splits the stock in a direction with its length, thus rendering the pair of skates useless, to the great annoyance of their owner. To remedy this evil to some degree it has been proposed to use metallic devices interposed between the upper edge of the runner and the wooden stock, but never have such devices been adapted to use with detachable screws and above the head of such screws and at the same time serve as a lateral brace and bearing—*i. e.*, as a brace to the stock and as a bearing to the runner.

Again, it never has been contrived in a skate to have a washer which is grooved longitudinally and adapted for use with detachable wood-screws, so applied and arranged that the forward and back strain on the screws shall not come directly upon the screw-fastenings. This end I have attained by letting the runner up into the groove of the washer and then letting the washer into the recesses of the stock. This result, in connection with a grooved metal washer, is new in the construction of skates, and under my patent I desire to be protected in the accomplishment of the result, whatever may be the means employed to that end, not that I would claim all new devices devised as improvements on my invention, but simply to have such devices subordinate to my invention, mine being the first.

It will be seen that with a simple washer or plate the runner has no side bearings below the stock or the shoulder of the fastening-stems. It will also be seen that a metal tube with wings or flanges, in connection with a screw which is not detachable, is very impracticable and insufficient to the end I have in view; besides this, auxiliary screws to fasten the flange of the tube are necessary, and the screws which sustain the runner have all the strain brought directly upon them.

It is evident that I supply in my simple grooved washer all the advantages of this metal tubular device interposed between the runner and the stock, and do away with all the disadvantages of the same; also, of effective side bearings or supports on the sides of the runner and braces to the stock, and withal my skates are light.

The metallic socket-plates will not be affected by water, and they will give a wide bearing-surface for stiffening the stock at the two points which receive the greatest pressure and strain—*i. e.*, the heel and toe.

By the introduction of my grooved metallic washer the screw-fastenings made separate from the runner can be practically employed, and thus is obviated the objections to welding these screws to the runners. This is an important item when it is considered that the best skate irons or runners are imported to this country ready stamped into shape, and it is an exceedingly nice operation to weld the screw-shanks to the edges of such skate-irons, the same requiring time and care to make a perfect weld, retemper the "iron," and finally to get the screw-stems or shanks exactly perpendicular and in the exact place on the runner, these difficulties being attended with more expense than can be afforded, inasmuch as the skates must be sold in the market at a small price.

I do not claim a washer with simply a vertical slot or hole through it, nor do I claim a shank or stem-fastening of a skate-runner in combination with such a washer, the stem being let up through the slot or hole and upset, so as to secure the runner to the washer; but What I do claim, and desire to secure by Letters Patent, is—

1. A detached washer or socketed plate, which has a vertical and a longitudinal channel formed in it, the two channels intersecting one another, the said washer-plate answering as an auxiliary to a skate-runner fastening—*i. e.*, a detached screw—substantially as and for the purpose set forth.

2. Interposing between the wooden stock and the metal runner a detachable longitudinally-grooved and vertically-perforated washer or socketed plate in such manner that it braces the wooden stock, gives side bearings to the runner, and also enables the runner to have end bearings, substantially in the manner set forth.

3. The combination of the longitudinally-slotted and vertically-perforated washer or socketed plate D, with a detachable wood-screw which extends up through the washer and the stock of the skate, in the manner and for the purpose substantially as described.

4. The combination of shoulders or standards of a skate-runner, and a detachable longitudinally-slotted and vertically perforated washer or socketed plate, substantially as and for the purpose set forth.

5. A detachable screw as a part of a skate-runner fastening, with two sides of its head made parallel and flush with the sides of the runner below the washer or socketed plate, in the manner herein described, for the purpose set forth.

6. The combination of the dovetail notch in the upper edge of the skate, the loose screw-fastening, and a longitudinally-grooved and vertically-perforated washer, substantially as and for the purpose set forth.

7. The combination of the recesses in the skate-stock, a metal socket-plate with longitudinal groove and a vertical perforation, and a screw-fastening, substantially as and for the purpose set forth.

8. The combination of the screw or screws, notch or notches for the heads of the screw or screws, longitudinally-grooved washer or washers, and the nut or other equivalent fastening or fastenings, as a means of uniting the stock and runner of a skate, substantially as described.

WILLIS L. GREGORY.

Witnesses:
J. G. PULVER,
E. TOWNSEND LANDON.